United States Patent [19]
Shin

[11] Patent Number: 6,092,614
[45] Date of Patent: Jul. 25, 2000

[54] STRUCTURE FOR INSTALLING SHOCK ABSORBER FOR REAR SUSPENSION IN SOLAR AUTOMOBILE

[75] Inventor: Tae-Hak Shin, Seoul, Rep. of Korea

[73] Assignee: Hyundai Motor Company, Seoul, Rep. of Korea

[21] Appl. No.: 08/988,160

[22] Filed: Dec. 10, 1997

[30] Foreign Application Priority Data

Dec. 19, 1996 [KR] Rep. of Korea ........................ 96-67734

[51] Int. Cl.⁷ ............................. B60G 3/00; B60K 16/00; B60L 8/00
[52] U.S. Cl. ...................................... 180/2.2; 280/124.134
[58] Field of Search ..................... 280/124.109, 124.116, 280/124.128, 124.134, 124.135, 124.136, 124.143, 124.145, 124.179, 284, 788, 2.2

[56] References Cited

U.S. PATENT DOCUMENTS

| | | | |
|---|---|---|---|
| 4,574,909 | 3/1986 | Ribi | 180/227 |
| 4,700,799 | 10/1987 | Kawano | 180/219 |
| 4,911,466 | 3/1990 | Blair | 280/124.134 |
| 5,411,285 | 5/1995 | Lee | 280/124.109 |
| 5,431,429 | 7/1995 | Lee | 280/124.136 |

*Primary Examiner*—Daniel G. DePumpo
*Assistant Examiner*—Christopher Bottorff

[57] ABSTRACT

A structure for installing a shock absorber for a rear suspension in a solar automobile is disclosed. The coupling portion between the rear suspension and the frame of the automobile is improved for its rigidity and duration, thereby improving the running safety of the automobile. The solar automobile includes a front watching frame 100, an upper cowl assembly 200 with the front watching frame coupled thereto, a frame assembly 300 coupled to a bottom of the upper cowl assembly, for bearing most loads imposed from a rear wheel and a rear trailing arm through a shock absorber, and an under body assembly 400 installed beneath the upper cowl assembly and the frame assembly. The structure for installing the shock absorber includes brackets 361 and 362 fastened by means of bolts 360 on both sides of a lower portion of a frame 310 of the frame assembly. A first link 363 is pivotally installed on the bracket and hinge-coupled to a second link 364, the rear wheel 350 being installed on the second link. Another end of the second link is pivotally coupled to a third link 366, and the third link is pivotally installed on a side of an upper bracket 365 which is fastened by means of bolts to a U-shaped upper portion of the frame 310. A fourth link 367 is hinge-coupled to a portion of the first link, and another end of the fourth link is hinge-coupled to a fifth link 368 which is pivotally installed on the upper portion of the upper bracket. A shock absorber 369 which is hinge-coupled to the brackets is pivotally hinge-coupled at a front end thereof to another end of the fifth link.

4 Claims, 3 Drawing Sheets

STRUCTURE FOR INSTALLING SHOCK ABSORBER FOR REAR SUSPENSION IN SOLAR AUTOMOBILE

BACKGROUND OF THE INVENTION

1. Field of the Invention

The present invention relates to a structure for installing a shock absorber for a rear suspension in a solar automobile. Particularly, the present invention relates to a structure for installing a shock absorber for a rear suspension in a solar automobile, in which the coupling portion between the rear suspension and the frame of the automobile is improved for its rigidity and duration, thereby improving the running safety of the automobile.

2. Description of the Prior Art

A solar automobile utilizes the solar energy instead of the general fuel. A heat collecting plate is installed on the solar automobile, and the heat collected from the heat collecting plate is converted into the dynamic power so as to run the automobile. This field has been continuously studied to replace exhaust fuels and as a measure for the aggravating environment.

In one example of the solar automobiles, a total of three wheels are provided, two being installed at the front and one being provided at the rear. This solar automobile is illustrated in FIG. 1.

As shown in this drawing, a front watching frame 100 is coupled to a proper portion of an upper cowl assembly 200. A frame assembly 300 which supports the majority of the weight of the automobile is coupled to the bottom of the upper cowl assembly 200. Under the upper cowl assembly 200 and the frame assembly 300, there is installed an under-body assembly 400.

As shown in FIGS. 2 and 3, the frame assembly 300 includes: a frame 310 having a certain shape; a bracket 320 fixed by means of bolts on the upper and lower portions of the frame 310 and a reinforcing plate 311 (which is installed on the frame 310); a shock absorber 340 and a rear trailing arm 330 fastened on the bracket 320 to form a triangular relationship; and a rear wheel 350 rotatably installed on the rear trailing arm 330.

The frame 310 includes a plate-like honeycomb member and, a carbon plate closely contacted on the upper and lower faces of the honeycomb member.

Accordingly, the reinforcing plate 311 is installed at the same portion as that of the shock absorber 340 and the rear trailing arm 330 (the rear suspension). Therefore it can support the frame 310 which is low in rigidity and durability.

However, the installation of the shock absorber of the rear suspension has the following difficulties. That is, although the reinforcing plate 311 is added to the frame 310 in installing the shock absorber 340 of the rear suspension, the space for installing the reinforcing plate 311 is limited. Therefore, the thickness of the reinforcing plate 311 has to be thin, and therefore, it can be deformed. Consequently, the rear suspension cannot be firmly fixed, with the result that vibrations occur, thereby aggravating the running stability.

SUMMARY OF THE INVENTION

The present invention is intended to overcome the above described disadvantages of the conventional technique.

Therefore it is an object of the present invention to provide a structure for installing a shock absorber for a rear suspension in a solar automobile, in which the force of the spring of the shock absorber (constituting the rear suspension) is dispersed to the front and rear of the frame, so that the twisting of the solar automobile is prevented, and that the rigidity and the durability of the coupling portion are improved.

In achieving the above object, in the structure for installing a shock absorber for a rear suspension in a solar automobile, the solar automobile includes: a front watching frame; an upper cowl assembly with the front watching frame coupled thereto; a frame assembly coupled to a bottom of the upper cowl assembly, for bearing most loads imposed from a rear wheel and a rear trailing arm through a shock absorber; and an under body assembly installed beneath the upper cowl assembly and the frame assembly, and the structure for installing the shock absorber includes: brackets fastened by means of bolts on both sides of a lower portion of a frame of the frame assembly; and a first link pivotally installed on the bracket and hinge-coupled to a second link, the rear wheel being installed on the second link.

Another end of the second link is pivotally coupled to a third link, and the third link is pivotally installed on a side of an upper bracket which is fastened by means of bolts to a U-shaped upper portion of the frame.

A fourth link is hinge-coupled to a portion of the first link, and another end of the fourth link is hinge-coupled to a fifth link which is pivotally installed on the upper portion of the upper bracket. A hinge-coupled shock absorber is pivotally hinge-coupled at a front end thereof to another end of the fifth link and to the bracket.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 1:
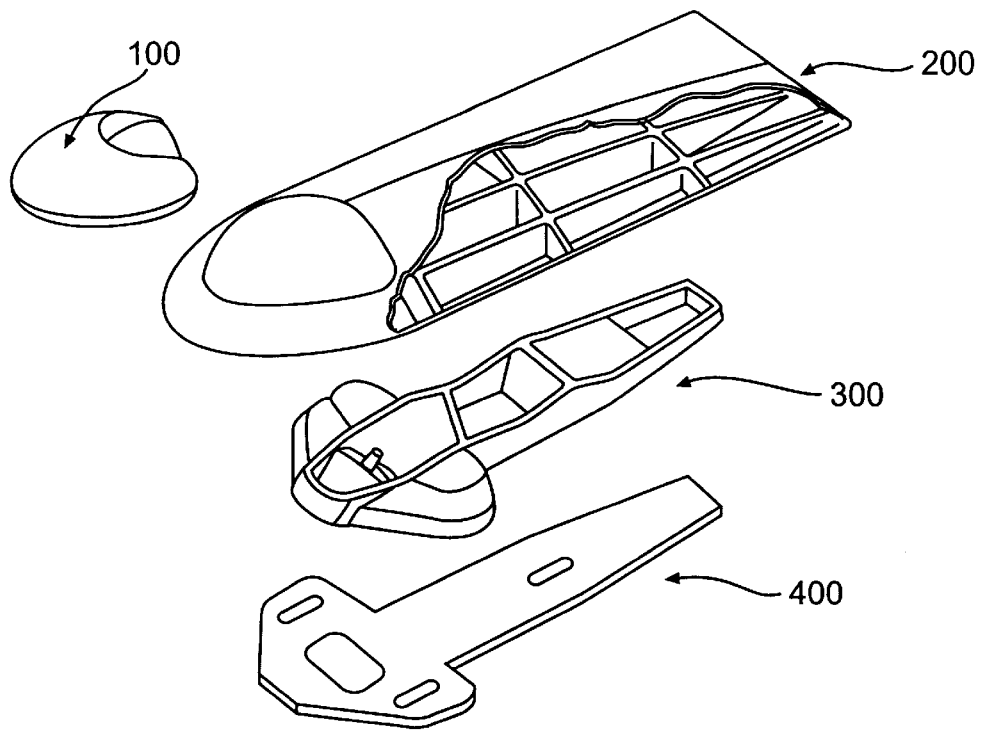
FIG. 1 is a schematic exploded perspective view of a conventional solar automobile.
Figure 2:
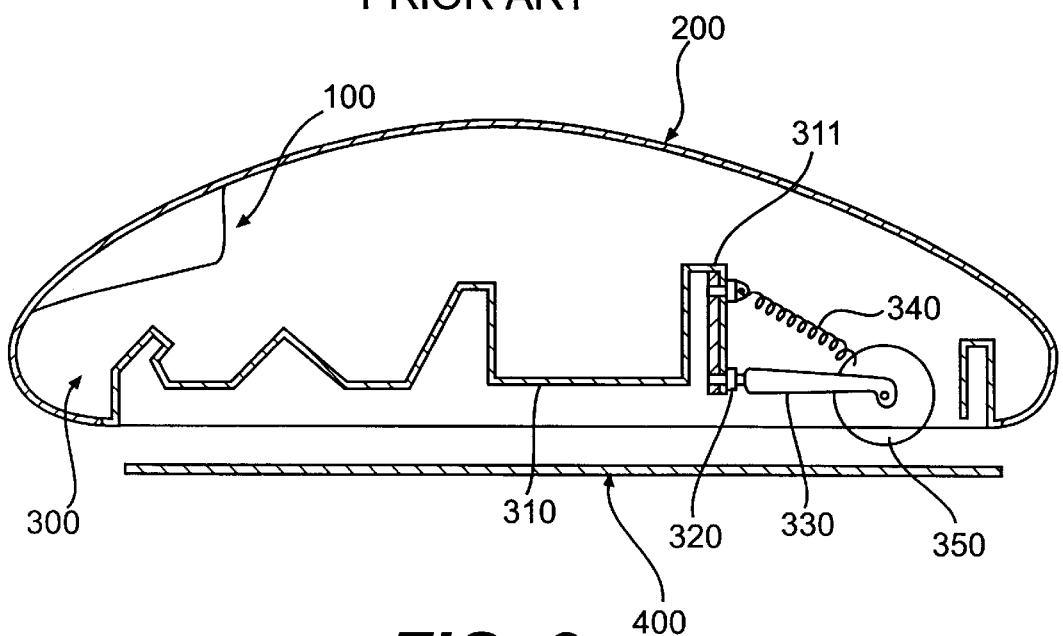
FIG. 2 is a schematic longitudinal sectional view of the assembled solar automobile of FIG. 1.
Figure 3:
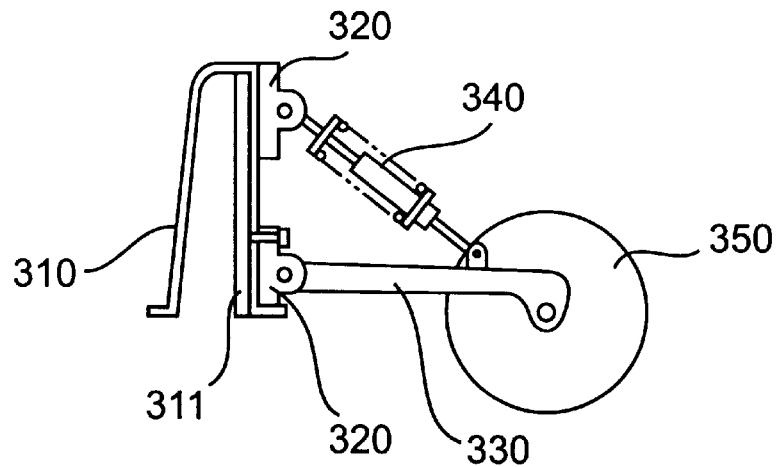
FIG. 3 is a schematic sectional view showing a state in which the shock absorber for the rear suspension is installed on the frame according to the conventional technique.
Figure 4:
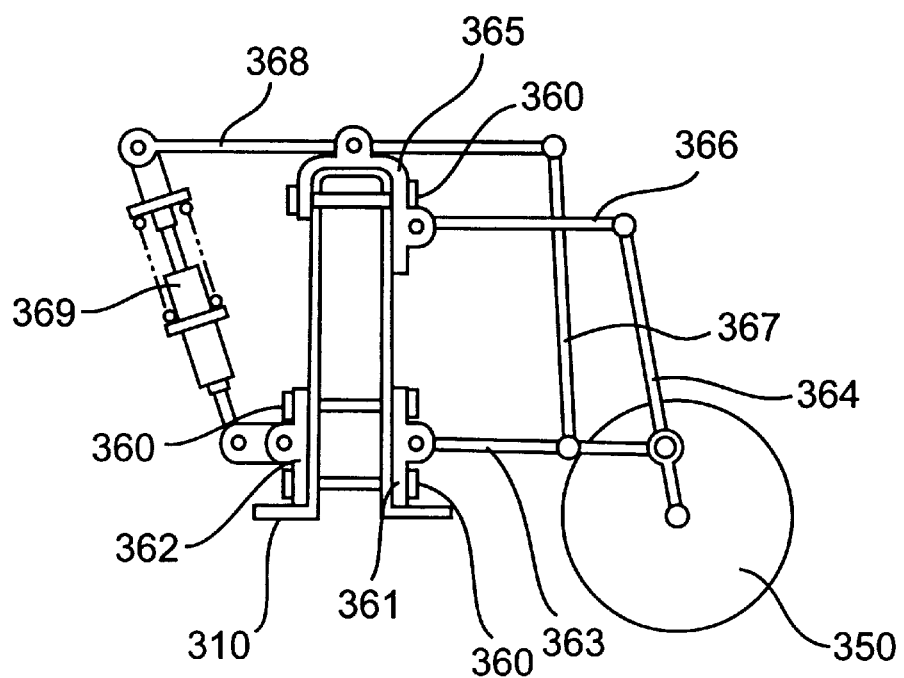
FIG. 4 is a schematic sectional view showing a state in which the shock absorber for the rear suspension is installed on the frame according to the present invention.

FIG. 4 is a schematic sectional view showing a state in which the shock absorber for the rear suspension is installed on the frame according to the present invention. The elements shown in FIGS. 1 to 3 of the conventional technique will be assigned with, the same reference numerals, and descriptions on them will be omitted.

In the structure for installing a shock absorber for a rear suspension in a solar automobile, the solar automobile includes: a front watching frame 100; an upper cowl assembly 200 with the front watching frame 100 coupled thereto; a frame assembly 300 coupled to a bottom of the upper cowl assembly, for bearing most loads imposed from a rear wheel and a rear trailing arm through the shock absorber; and an under body assembly 400 installed beneath the upper cowl assembly 200 and the frame assembly 300, and the structure for installing the shock absorber includes: brackets 361 and 362 fastened by means of bolts 360 on both sides of a lower portion of a frame 310 of the frame assembly 300; and a first link 363 pivotally installed on the bracket 361 and hinge-coupled to a second link 364, the rear wheel 350 being installed on the second link 364.

Another end of the second link 364 is pivotally coupled to a third link 366, and the third link 366 is pivotally installed on a side of an upper bracket 365 which is fastened by means of bolts 360 to a U-shaped upper portion of the frame 310.

A fourth link 367 is hinge-coupled to a portion of the first link 363, and another end of the fourth link 367 is hinge-coupled to a fifth link 368 which is pivotally installed on the upper portion of the upper bracket 365. A shock absorber 369 is hinge-coupled to another end of the fifth link 368 and to the bracket 362.

The upper bracket 365, the third link 366 and the fifth link 368 are unitized so that they can be hinge-coupled. However, they may be separately installed.

Figure 5:
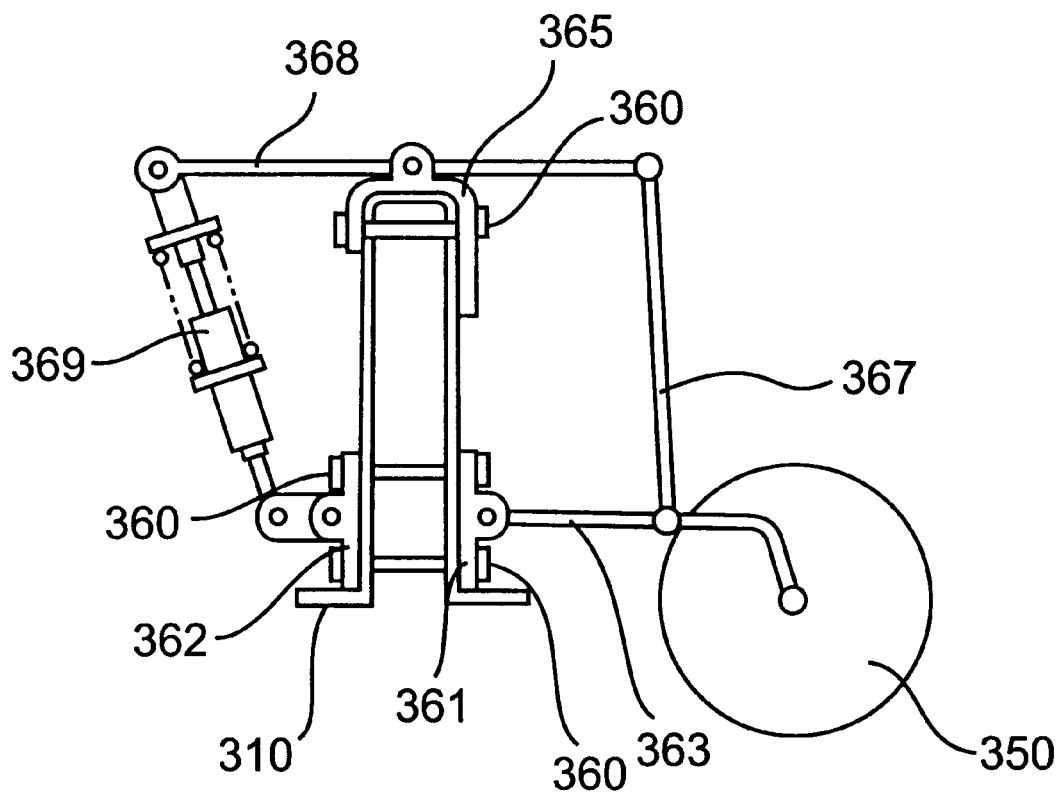
FIG. 5 is a schematic sectional view showing a state in which the shock absorber for the rear suspension is installed on the frame according to the other embodiment of the present invention.

Furthermore, as shown in FIG. 5 of the other embodiment, the rear wheel 350 is pivotally coupled to a front end of the first link 363, wherein the present invention can be performed even without the second link 364 and third link 366.

Meanwhile, when the center portion of the rear wheel 350, as shown in FIG. 4, is positioned bellow the hinge-coupled portion of the first link 363, it allows the rear wheel 350 to be easily mounted to the frame, thereby improving the ability to travel along a road. The device of the present invention as described above will now be described as to its action and effects.

If impacts are transmitted from the road to the rear wheel 350 which is installed on the second link 364, then the impacts are transmitted to the first and third links 363 and 366 which are hinge-coupled to the second link 364. Under this condition, the fourth link 367 which is hinge-coupled to the first link 363 pushes up the fifth link 368 so as to compress the shock absorber 369, and so as to disperse the force to the brackets 361 and 362.

Meanwhile, if the rear wheel 350 descends, then the respective links actuate oppositely, thereby extending the shock absorber 369.

Further, the center of the rear wheel 350 is made to come down below the hinge-coupled portion of the first link 363, and thus, the rear wheel 350 is made to withdraw upon receipt of impacts. Therefore, the automobile is made to be better adapted to the road compared with the conventional device.

According to the present invention as described above, the force of the spring which is installed in the shock absorber of the rear suspension is made to be branched to the front and rear. Therefore, the twisting problem of the solar automobile is solved, and the rigidity and durability of the coupled portion can be improved.

The present invention was described based on the preferred embodiment in the above, but the present invention will not be limited to the preferred embodiment. It will be apparent to those ordinarily skilled in the art that various changes and modifications can be added without departing from the scope of the present invention.

What is claimed is:

1. In combination a structure for installing a shock absorber for a rear suspension in a solar automobile, and the solar automobile, comprising:

said solar automobile including, a front watching frame, an upper cowl assembly with said front watching frame coupled thereto, a frame assembly coupled to a bottom of said upper cowl assembly, for bearing most loads imposed from a rear wheel and a rear trailing arm through a shock absorber, and an under body assembly installed beneath said upper cowl assembly and said frame assembly; and said structure for installing said shock absorber including, a vertically extending frame portion of the frame assembly having a reinforcing plate assembly therein, the frame portions and plate assembly providing the major support for the rear suspension, a first link pivotally installed on said frame portion and hinge-coupled to an intermediate portion of a second link, said rear wheel being installed on a distal end of said second link, another end of said second link being pivotally coupled to a third link, and said third link being pivotally installed to said frame portion at an upper end thereof, a fourth link hinge-coupled to a portion of said first link, and another end of said fourth link being hinge-coupled to a fifth link which is pivotally installed on the upper end of said frame portion, and a shock absorber hinge-coupled to said vertically extending frame portion, said shock absorber hinge-coupled at a front end thereof pivotally to another end of said fifth link.

2. The structure as claimed in claim 1, wherein a center portion of said rear wheel is positioned on the distal end of the second link below said hinge-coupled portion of said first link.

3. In combination a structure for installing a shock absorber for a rear suspension in a solar automobile, and the solar automobile comprising:

said solar automobile including a front watching frame, an upper cowl assembly with said front watching frame coupled thereto, a frame assembly coupled to a bottom of said upper cowl assembly, for bearing most loads imposed from a rear wheel and a rear trailing arm through a shock absorber, and an under body assembly installed beneath said upper cowl assembly and said frame assembly; and said structure for installing said shock absorber including, a vertically extending frame portion of the frame assembly having a reinforcing plate assembly therein, the frame portions and plate assembly providing the major support for the rear suspension, a rear wheel coupled pivotally to a downwardly extending leg of a first link hinge-coupled to said frame portion, a second link hinge-coupled to a portion of said first link, and another end of said second link being hinge-coupled to a third link which is pivotally installed on an upper portion of said frame portion, and a hinge-coupled shock absorber hinge-coupled pivotally at a front end thereof to another end of said third link and to said frame portion.

4. The structure as claimed in claim 3, wherein said rear wheel is positioned at a center thereof on the downwardly extending leg of the first link below said hinge-coupled portion of said first link.

* * * * *